(12) United States Patent
Sartorius et al.

(10) Patent No.: US 11,175,926 B2
(45) Date of Patent: Nov. 16, 2021

(54) PROVIDING EXCEPTION STACK MANAGEMENT USING STACK PANIC FAULT EXCEPTIONS IN PROCESSOR-BASED DEVICES

(71) Applicant: Microsoft Technology Licensing, LLC, Redmond, WA (US)

(72) Inventors: Thomas Andrew Sartorius, Raleigh, NC (US); Michael Scott McIlvaine, Raleigh, NC (US); James Norris Dieffenderfer, Apex, NC (US); Aaron S. Giles, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 29 days.

(21) Appl. No.: 16/843,389

(22) Filed: Apr. 8, 2020

(65) Prior Publication Data

US 2021/0318884 A1 Oct. 14, 2021

(51) Int. Cl.
*G06F 9/38* (2018.01)
*G06F 9/30* (2018.01)
*G06F 11/07* (2006.01)

(52) U.S. Cl.
CPC ........ *G06F 9/3861* (2013.01); *G06F 9/30101* (2013.01); *G06F 11/0721* (2013.01); *G06F 11/0793* (2013.01); *G06F 9/3865* (2013.01)

(58) Field of Classification Search
CPC .............. G06F 9/30101; G06F 9/3861; G06F 11/0721; G06F 11/0793
See application file for complete search history.

(56) References Cited

U.S. PATENT DOCUMENTS

| 5,481,719 A * | 1/1996 | Ackerman ............ G06F 9/4812 |
| | | 712/221 |
| 2002/0144184 A1 | 10/2002 | Anvin et al. |
| 2003/0018681 A1* | 1/2003 | Subramanian ........ G06F 9/3861 |
| | | 718/102 |
| 2007/0006200 A1* | 1/2007 | Renno ................. G06F 9/30181 |
| | | 717/162 |

(Continued)

OTHER PUBLICATIONS

"International Search Report and Written Opinion Issued in PCT Application No. PCT/US21/022272", dated Jul. 13, 2021, 12 Pages.

*Primary Examiner* — William B Partridge
(74) *Attorney, Agent, or Firm* — Withrow & Terranova, PLLC (57) ABSTRACT

Providing exception stack management using stack panic fault exceptions in processor-based devices is disclosed. In this regard, a processor device defines a "stack panic fault exception" that may be raised upon execution of an exception handler store operation attempting to write state data into an exception stack, and provides a dedicated plurality of stack panic fault exception state registers in which stack panic fault exception state data may be saved. Upon detecting a first exception, the processor device transfers program control to an exception handler for the first exception. If a second exception occurs upon execution of a store operation in the exception handler, the processor device determines that the second exception should be handled as a stack panic fault exception, saves the stack panic fault exception state data in the stack panic fault exception state registers, and transfers program control to a stack panic fault exception handler.

20 Claims, 7 Drawing Sheets

(56) References Cited

U.S. PATENT DOCUMENTS

| | | | |
|---|---|---|---|
| 2007/0266374 A1* | 11/2007 | Grisenthwaite | G06F 9/462 |
| | | | 717/127 |
| 2011/0016295 A1 | 1/2011 | Catherwood | |
| 2013/0205125 A1* | 8/2013 | Grocutt | G06F 9/30123 |
| | | | 712/244 |
| 2014/0052966 A1* | 2/2014 | Vahidsafa | G06F 11/0721 |
| | | | 712/220 |
| 2017/0277537 A1* | 9/2017 | Grocutt | G06F 9/30036 |

* cited by examiner

PROVIDING EXCEPTION STACK MANAGEMENT USING STACK PANIC FAULT EXCEPTIONS IN PROCESSOR-BASED DEVICES

FIELD OF THE DISCLOSURE

The technology of the disclosure relates to exception handling in processor-based devices, and, more particularly, to exception stack management.

BACKGROUND

A primary function of processor-based devices is the execution of software processes or programs that comprise computer-executable instructions. Generally speaking, the particular sequence in which a processor-based device executes instructions may be determined either by the order of the instructions in the original software code (i.e., "program order"), or by branch instructions that may transfer program control to an instruction other than the next sequential instruction in program order. Additionally, circumstances may arise in which a special or anomalous condition (i.e., an "exception") that occurs during execution of a software process requires special handling. In such cases, execution of the original software process may be suspended, and program control may be transferred to a set of instructions known as an "exception handler" to address or remedy the circumstances that gave rise to the exception. When the exception handler completes execution, program control may be returned to the original software process if the exception was successfully remedied, the software process may be terminated if the exception cannot be remedied, or the original software process may be suspended to allow another process to execute.

As part of conventional exception handling, the processor-based device may first save exception state data into specialized registers referred to herein as exception state registers. The exception state registers may be used to save exception state data such as the value of a program counter at the time the exception occurred, as well as data related to the state of the processor-based device (e.g., processor mode, address translation settings, and the like, as non-limiting examples). Once program control is transferred to the exception handler, additional state data that may be required to preserve or restore the state of the processor-based device (e.g., the current values of general purpose registers (GPRs) and/or floating point registers (FPRs), as non-limiting examples) must be expressly stored by the exception handler in a data structure known as an exception stack. Thus, one of the first functions performed by the exception handler is the execution of one or more store operations to write the additional state data into the exception stack (either by executing a store instruction, or by the processor-based device automatically performing the store operation to the exception stack without actually executing a store instruction). However, in some scenarios it may be possible for a further exception to occur as a result of executing the store operations to the exception stack within the exception handler. The occurrence of such a second exception could result in the exception state data that was saved to the exception state registers as a result of the first exception being overwritten and lost, making it impossible to restore the processor-based device to its original state.

Conventionally, this issue has been addressed by using one of two approaches to prevent the occurrence of a second exception. Under the first approach, the exception handler takes additional steps to ensure that a second exception cannot occur when the exception handler attempts to store state data for the first exception. For example, the processor-based device may allocate dedicated memory pages for the exception stack that are guaranteed to always be accessible, and the exception handler may include an instruction sequence(s) to guarantee that a stack pointer used to access the exception stack can never reference an address outside the dedicated memory pages. The second approach requires that the exception handler take additional steps to precheck the stack pointer's value before attempting to store state data. If the exception handler determines that use of the stack pointer will result in a second exception, the exception handler may either store the state data in an alternate location, or may correct the stack pointer value so that use of the stack pointer will no longer lead to a second exception. Both of these approaches, though, may require additional processing and/or additional system resources that may result in reduced processor performance and reduced system flexibility.

Accordingly, it is desirable to provide a mechanism for exception stack management to ensure that exception state data for a first exception can be successfully preserved even if a second exception occurs within the exception handler, while avoiding the performance penalties incurred by existing mechanisms.

SUMMARY

Exemplary embodiments disclosed herein include providing exception stack management using stack panic fault exceptions in processor-based devices. In this regard, in one exemplary embodiment, a processor-based device includes a processor device that defines a new type of exception referred to herein as a "stack panic fault exception." A stack panic fault exception is an exception that may be raised by a store operation that is executed within an exception handler and that attempts to write state data into an exception stack. The processor device also provides a dedicated plurality of stack panic fault exception state registers in which exception state data associated with a stack panic fault exception may be saved. Upon detecting a first exception while executing a software process, the processor device in some embodiments may save exception state data in exception state registers in conventional fashion, and then transfer program control to an exception handler corresponding to the first exception. If a second exception occurs upon execution of a store operation in the exception handler to the exception stack, the processor device determines that the second exception should be handled as a stack panic fault exception (e.g., based on a custom opcode, custom bit indicator, or a custom operand of the store instruction that performed the store operation; by determining that the store operation is performed by a store instruction that is among a first N store instructions within the exception handler, where N is a positive integer; or by determining that a stack panic indicator is set, as non-limiting examples). In response to determining that the second exception should be handled as a stack panic fault exception, the processor device saves stack panic fault exception state data in the plurality of dedicated stack panic fault exception state registers. The processor device then transfers program control to a stack panic fault exception hander. In this manner, the stack panic fault exception can be safely handled without the need for an additional instruction sequence(s) in the exception handler or additional system resources, and without losing the exception state data saved as a result of the first exception.

In another exemplary embodiment, a processor-based device is provided. The processor-based device comprises an exception stack and a plurality of dedicated stack panic fault exception state registers. The processor device is configured to detect a first exception while executing a software process, and, responsive to detecting the first exception, transfer program control to an exception handler corresponding to the first exception. The processor device is further configured to execute a store operation within the exception handler to store state data in the exception stack. The processor device is also configured to detect a second exception while executing the store operation, and determine that the second exception should be handled as a stack panic fault exception. The processor device is additionally configured to, responsive to determining that the second exception should be handled as a stack panic fault exception, save stack panic fault exception state data in the plurality of dedicated stack panic fault exception state registers, and transfer program control to a stack panic fault exception handler corresponding to the stack panic fault exception.

In another exemplary embodiment, a method for providing exception stack management using stack panic fault exceptions is provided. The method comprises detecting, by a processor device of a processor-based device, a first exception while executing a software process. The method further comprises, responsive to detecting the first exception, transferring program control to an exception handler corresponding to the first exception. The method also comprises executing a store operation within the exception handler to store state data in an exception stack of the processor device. The method additionally comprises detecting a second exception while executing the store operation. The method further comprises determining that the second exception should be handled as a stack panic fault exception. The method also comprises, responsive to determining that the second exception should be handled as a stack panic fault exception, saving stack panic fault exception state data in a plurality of dedicated stack panic fault exception state registers, and transferring program control to a stack panic fault exception handler corresponding to the stack panic fault exception.

In another exemplary embodiment, a non-transitory computer-readable medium having stored thereon computer-executable instructions is provided. The computer-executable instructions, when executed by a processor, cause the processor to detect a first exception while executing a software process. The computer-executable instructions further cause the processor to, responsive to detecting the first exception, transfer program control to an exception handler corresponding to the first exception. The computer-executable instructions also cause the processor to execute a store operation within the exception handler to store state data in an exception stack. The computer-executable instructions additionally cause the processor to detect a second exception while executing the store operation. The computer-executable instructions further cause the processor to determine that the second exception should be handled as a stack panic fault exception. The computer-executable instructions also cause the processor to, responsive to determining that the second exception should be handled as a stack panic fault exception, save stack panic fault exception state data in a plurality of dedicated stack panic fault exception state registers of the processor, and transfer program control to a stack panic fault exception handler corresponding to the stack panic fault exception.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure.

DETAILED DESCRIPTION

Exemplary embodiments disclosed herein include providing exception stack management using stack panic fault exceptions in processor-based devices. In one exemplary embodiment, a processor-based device includes a processor device that defines a new type of exception referred to herein as a "stack panic fault exception." A stack panic fault exception is an exception that may be raised by a store operation that is executed within an exception handler and that attempts to write state data into an exception stack. The processor device also provides a dedicated plurality of stack panic fault exception state registers in which exception state data associated with a stack panic fault exception may be saved. Upon detecting a first exception while executing a software process, the processor device in some embodiments may save exception state data in exception state registers in conventional fashion, and then transfer program control to an exception handler corresponding to the first exception. If a second exception occurs upon execution of a store operation in the exception handler to the handler stack, the processor device determines that the second exception should be handled as a stack panic fault exception (e.g., based on a custom opcode, custom bit indicator, or a custom operand of the store instruction that performed the store operation; by determining that the store operation is performed by a store instruction that is among a first N store instructions within the exception handler, where N is a positive integer; or by determining that a stack panic indicator is set, as non-limiting examples). In response to determining that the second exception should be handled as a stack panic fault exception, the processor device saves stack panic fault exception state data in the plurality of dedicated stack panic fault exception state registers. In some embodiments, the processor device may then transfer program control to a stack panic fault exception hander. In this manner, the stack panic fault exception can be safely handled without the need for an additional instruction sequence(s) in the exception handler or additional system resources, and without losing the exception state data saved as a result of the first exception.

Figure 1:
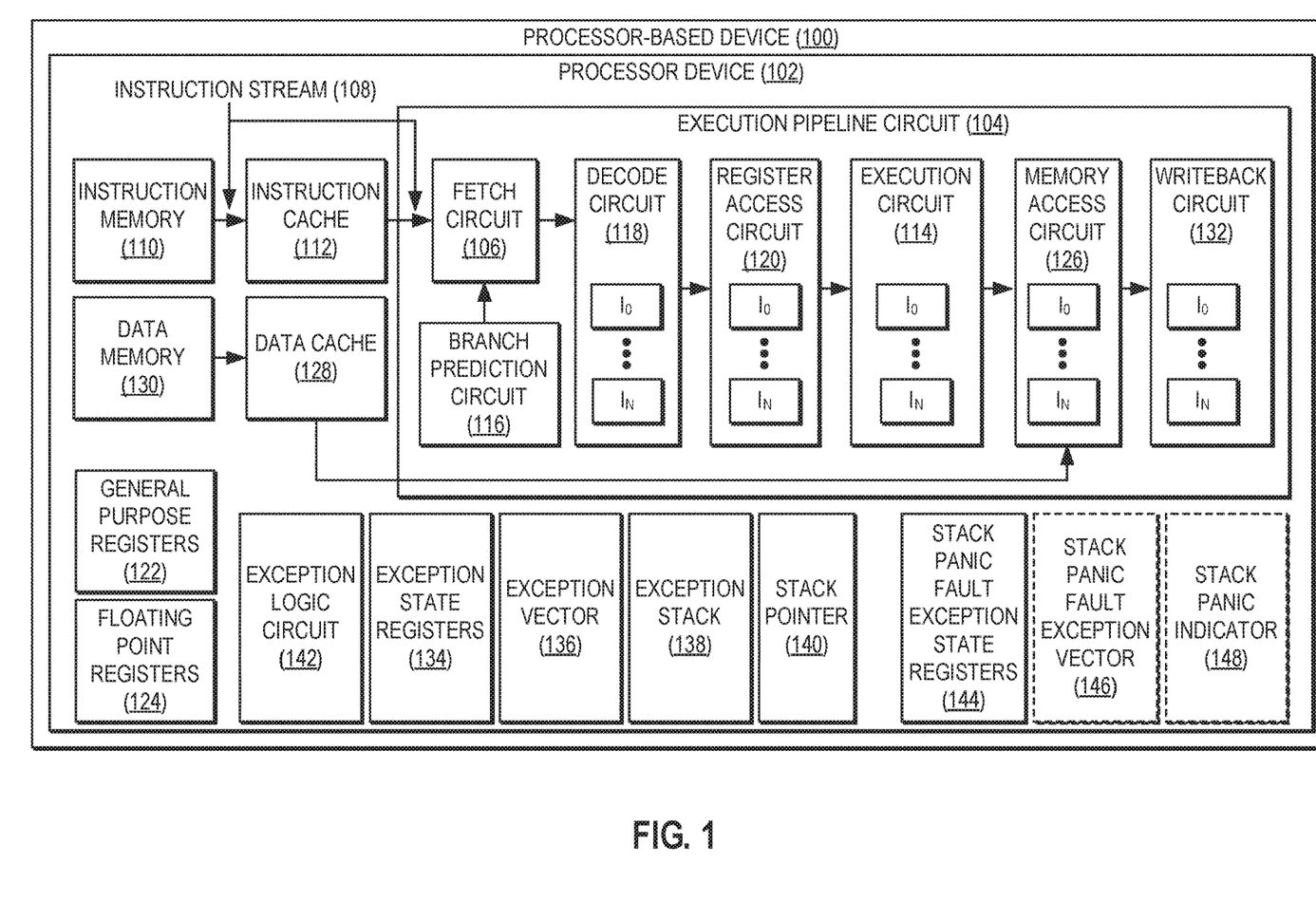
FIG. 1 is a block diagram illustrating an exemplary processor-based device configured to providing exception stack management using stack panic fault exceptions.

In this regard, FIG. 1 illustrates an exemplary processor-based device 100 that provides a processor device 102 for processing executable instructions. The processor device 102 in some embodiments may be one of a plurality of processor devices of the processor-based device 100. The processor device 102 of FIG. 1 includes an execution pipeline circuit 104 that is configured to perform execution of an instruction stream 108 comprising computer-executable instructions. In the example of FIG. 1, the execution pipeline circuit 104 includes a fetch circuit 106 that is configured to fetch the instruction stream 108 of executable instructions from an instruction memory 110. The instruction memory 110 may be provided in or as part of a system memory (not shown) of the processor-based device 100, as a non-limiting example. An instruction cache 112 may also be provided in the processor device 102 to cache instructions fetched from the instruction memory 110 to reduce latency in the fetch circuit 106. The fetch circuit 106 in the example of FIG. 1 is configured to provide instructions into one or more instruction pipelines $I_0$-$I_N$ to be pre-processed before the instructions reach an execution circuit 114 to be executed. The instruction pipelines $I_0$-$I_N$ are provided across different processing circuits (or "stages") of the execution pipeline circuit 104 to concurrently process fetched instructions to increase throughput prior to execution of the fetched instructions in the execution circuit 114.

A branch prediction circuit 116 is also provided in the execution pipeline circuit 104 of FIG. 1 to predict a branch target address for control flow instructions (e.g., conditional branch instructions, as a non-limiting example). The prediction of the branch target address by the branch prediction circuit 116 may be used by the fetch circuit 106 to determine the next instructions to fetch based on the predicted target address. The execution pipeline circuit 104 additionally includes a decode circuit 118 that is configured to decode instructions fetched by the fetch circuit 106 into decoded instructions to determine the instruction type and actions required, and further to determine into which instruction pipeline $I_0$-$I_N$ the decoded instructions should be placed. The decoded instructions are then placed into one or more of the instruction pipelines $I_0$-$I_N$, and are next provided to a register access circuit 120. The register access circuit 120 is configured to access physical registers, such as general purpose registers 122 and/or floating point registers 124, to retrieve produced values from previously executed instructions from the execution circuit 114. The register access circuit 120 is also configured to provide a retrieved produced value from an executed instruction as a source register operand of a decoded instruction to be executed. The execution pipeline circuit 104 further includes a memory access circuit 126 which is configured to access data in a data cache 128 or in a data memory 130 as a result of execution of instructions by the execution circuit 114. Finally, the execution pipeline circuit 104 includes a writeback circuit 132 which is configured to write the results generated by executed instructions back into the registers.

To enable recovery following the occurrence of an exception, the processor device 102 provides exception state registers 134 for use in saving exception state data prior to transferring program control to an exception handler (not shown). In some embodiments, the exception state registers 134 may include an exception link register (ELR), as a non-limiting example. The processor device 102 is configured to use the exception state registers 134 to save exception state data including, for example, a value of a program counter at the time the exception occurred, as well as data related to the state of the processor device 102 such as a processor mode, address translation settings, and the like, as non-limiting examples. The processor device 102 may then transfer program control to an exception handler corresponding to the exception. In this regard, the processor device 102 includes an exception vector 136 that points to the exception handler to be executed for the exception. In some embodiments, the exception vector 136 may be one of a plurality of exception vectors 136 stored in an interrupt vector table (not shown).

After the processor device 102 transfers program control to the exception handler corresponding to the exception, the exception handler may use an exception stack 138 to store additional state data required to preserve or restore the state of the processor device 102. The exception stack 138 represents a memory area within the memory hierarchy of the processor device 102, and as such may be stored and/or cached within system memory or caches of the processor device 102. According to some embodiments, the additional state data may comprise the current values of one or more of the GPRs 122 and/or the current values of one or more of the FPRs 124, as non-limiting examples. The exception stack 138 may be accessed using a stack pointer 140 that points to a next available storage location within the exception stack 138. Logic provided by the processor device 102 for detecting exceptions and subsequently redirecting program control may be embodied in hardware as an exception logic circuit 142. It is to be understood that, while the exception logic circuit 142 is illustrated as a separate element of the processor device 102, in some embodiments the exception logic circuit 142 may be integrated into one or more other elements of the processor device 102, such as the execution pipeline circuit 104.

The processor-based device 100 of FIG. 1 and the constituent elements thereof may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 may include more or fewer elements than illustrated in FIG. 1. For example, the processor device 102 may further include one or more functional units, instruction caches, unified caches, memory controllers, interconnect buses, and/or additional memory devices, caches, and/or controller circuits, which are omitted from FIG. 1 for the sake of clarity. Additionally, the execution pipeline circuit 104 of FIG. 1 may include more or fewer circuits or stages than illustrated in FIG. 1.

As noted above, it may be possible for a second exception to occur as a result of executing a store operation to store additional state data to the exception stack 138 within an exception handler that is executed to remedy a first exception. The occurrence of such a second exception could result in the exception state data that was saved in the exception state registers 134 being overwritten and lost, making it impossible to restore the processor-based device 100 to its original state prior to the first exception. Moreover, conventional approaches to addressing this issue require may additional processing and/or additional system resources that result in reduced processor performance and reduced system flexibility for the processor-based device 100.

In this regard, the processor device 102 of FIG. 1 is configured to define a new type of exception referred to herein as a "stack panic fault exception," which may be raised by a store operation that is executed within an exception handler and that attempts to write state data into the exception stack 138. The processor device 102 is also configured to provide a dedicated plurality of stack panic fault exception state registers 144, in which exception state data associated with a stack panic fault exception may be saved. The dedicated plurality of stack panic fault exception state registers 144 may include registers corresponding in functionality to the exception state registers 134. For example, the dedicated plurality of stack panic fault exception state registers 144 may include a stack panic fault exception link register (SPFELR) that corresponds in functionality to the ELR of the exception state registers 134.

Upon detecting a first exception while executing a software process, the processor device 102 in some embodiments may save exception state data in the exception state registers 134 in conventional fashion. The processor device 102 is configured to then transfer program control to an exception handler corresponding to the first exception. If a second exception occurs upon execution of a store operation in the exception handler to the exception stack, the processor device determines that the second exception should be handled as a stack panic fault exception. In response to determining that the second exception should be handled as a stack panic fault exception, the processor device saves stack panic fault exception state data in the plurality of dedicated stack panic fault exception state registers 144, and then transfers program control to a stack panic fault exception handler. In this manner, the stack panic fault exception can be safely handled without the need for an additional instruction sequence(s) in the exception handler or additional system resources, and without losing the exception state data saved in the exception state registers 134 as a result of the first exception.

In preferred embodiments, the processor device 102 provides a stack panic fault exception vector 146, separate from the exception vector 136, that points to the stack panic fault exception handler to be executed in response to the stack panic fault exception. Alternatively, in response to the stack panic fault exception, the processor device 102 could transfer program control to the conventional exception handler indicated by the exception vector 136, and then determine whether to branch to the stack panic fault exception handler. However, this approach is not preferred because it would require one or more additional instructions within the exception handler to determine whether to branch to the stack panic fault exception handler. These one or more additional instructions would be executed every time the exception handler is invoked, and thus would incur a performance penalty.

In some embodiments, the processor device 102 may determine that the second exception should be handled as a stack panic fault exception by determining that a store instruction that performed the store operation is "stack-panic-fault-enabled" based on characteristics of the store instruction. For example, the processor device 102 may determine that the store operation was performed by a store instruction that comprises a custom opcode, a custom bit indicator within a conventional opcode, or a custom operand along with a conventional opcode, wherein the custom opcode, the custom bit indicator, or the custom operand indicates that the store instruction raises a stack panic fault exception. Some embodiments may provide that the processor device 102 may determine that the second exception should be handled as a stack panic fault exception by determining that the store operation is performed by a store instruction that is within the first N store instructions within the exception handler, where N is a positive integer. In such embodiments, the value of N may be selected according to the requirements of each particular embodiment. For example, some embodiments may provide that N equals one (1), such that the processor device 102 determines that the second exception should be handled as a stack panic fault exception by determining that the store operation is performed by a store instruction that is the ordinal first store instruction to execute within the exception handler.

According to some embodiments, the processor device 102 provides a stack panic indicator 148 that may be set upon transferring program control to the exception handler in response to the first exception. When the second exception is detected, the processor device 102 may determine that the second exception should be handled as a stack panic fault exception by determining that the stack panic indicator 148 is set. In such embodiments, the stack panic indicator 148 may be cleared once the exception handler completes execution.

Figure 2:
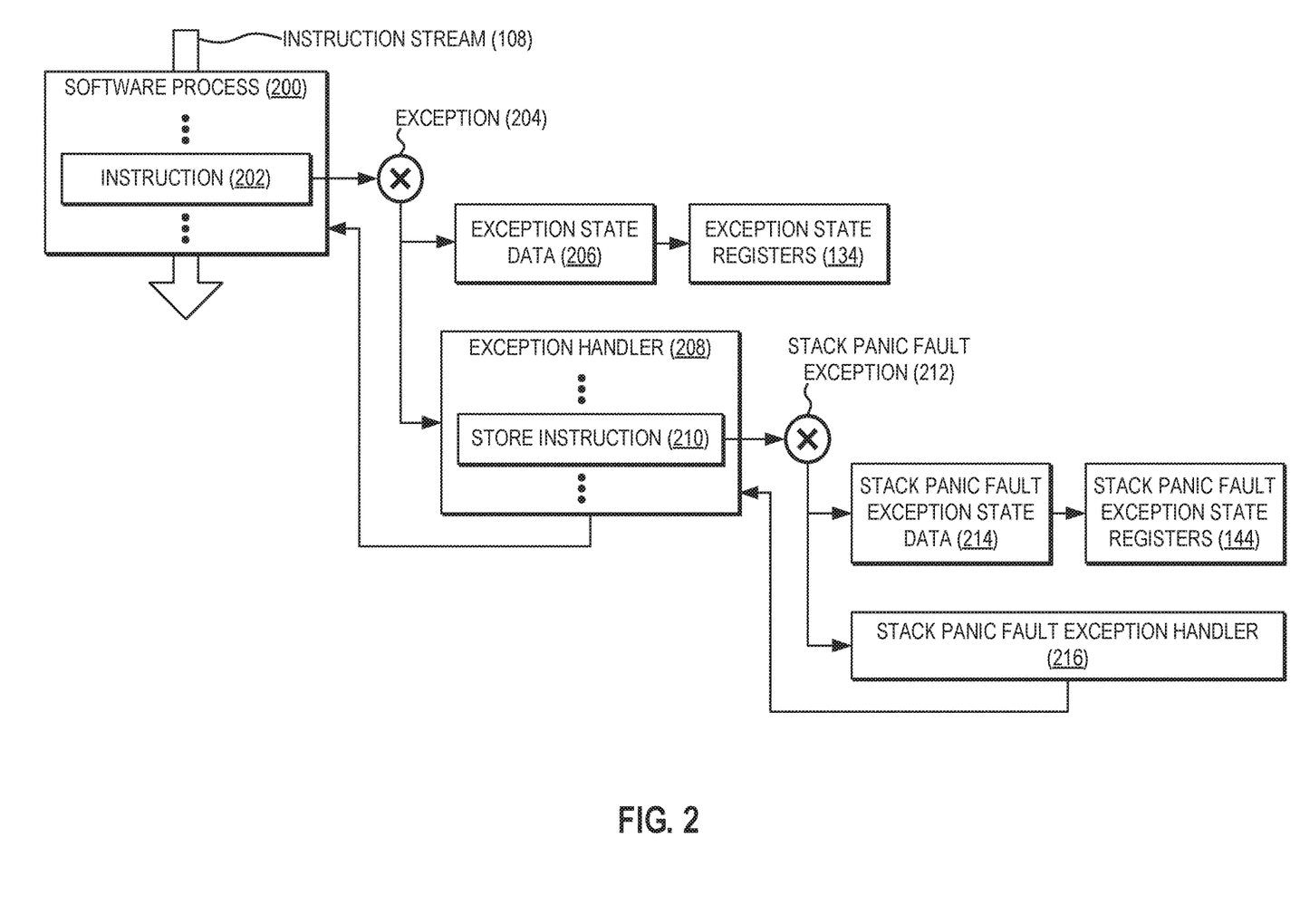
FIG. 2 is a diagram illustrating exemplary operations for handling a stack panic fault exception occurring as a result of an attempt to store state data in an exception stack, according to some embodiments.

To illustrate exemplary operations for handling a stack panic fault exception occurring as a result of an attempt to store state data in the exception stack 138 of FIG. 1 according to some embodiments, FIG. 2 is provided. As seen in FIG. 2, the instruction stream 108 of FIG. 1 comprises a software process 200 being executed by the processor device 102 of FIG. 1. The software process 200 includes an instruction 202 that, when executed, results in a first exception 204 being raised. As part of conventional exception handling, the processor device 102 (e.g., the exception logic circuit 142 of FIG. 1) saves exception state data 206 in the exception state registers 134 of FIG. 1. The processor device 102 then transfers program control to an exception handler 208 corresponding to the first exception 204.

During execution of the exception handler 208, the processor device 102 attempts to perform a store operation by executing a store instruction 210 to store additional state data in the exception stack 138 of FIG. 1. However, execution of the store instruction 210 in the example of FIG. 2 results in a second exception 212, which the processor device 102 determines should be handled as a stack panic fault exception 212. Upon determining that the second exception 212 should be handled as a stack panic fault exception 212, the processor device 102 saves stack panic fault exception state data 214 in the plurality of dedicated stack panic fault exception state registers 144 of FIG. 1. The processor device 102 then transfers program control to a stack panic fault exception handler 216 (e.g., as indicated by the stack panic fault exception vector 146 of FIG. 1, according to some embodiments). If the stack panic fault exception handler 216 is able to remedy the circumstances that gave rise to the stack panic fault exception 212, the processor device 102 may then transfer program control back to the exception handler 208. Similarly, if the exception handler 208 successfully remedies the circumstances that gave rise to the first exception 204, the processor device 102 may transfer program control back to the software process 200 being executed.

Figure 3A:
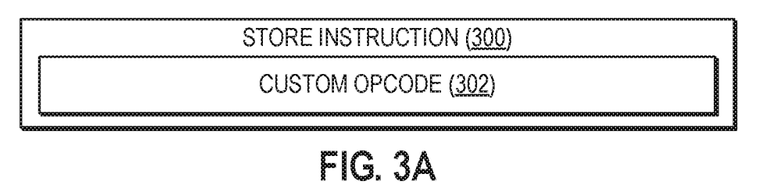
FIG. 3A-3C are block diagrams illustrating exemplary embodiments of a stack-panic-fault-enabled store instruction, according to some embodiments.
Figure 3B:
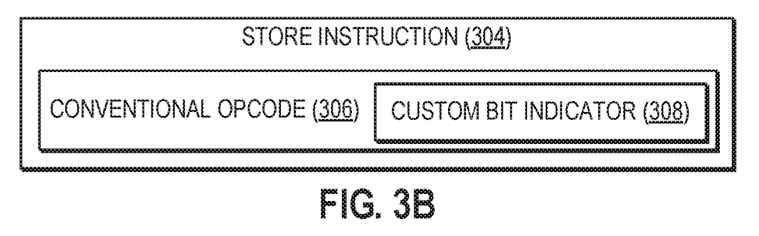
Figure 3C:
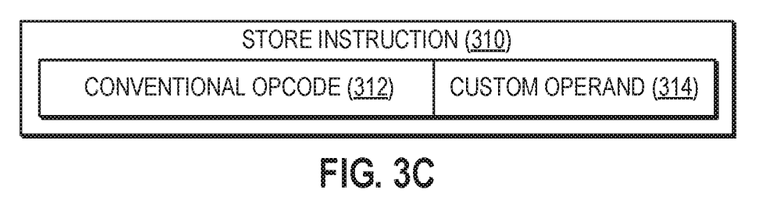

FIG. 3A-3C are block diagrams illustrating exemplary embodiments of the stack-panic-fault-enabled store instruction 210 of FIG. 2, according to some embodiments. In the embodiment illustrated in FIG. 3A, a store instruction 300, corresponding in functionality to the store instruction 210 of FIG. 2, comprises a custom opcode 302 (i.e., a non-standard opcode that differs from a conventional store instruction opcode provided by the processor device 102). In such embodiments, the processor device 102 may determine that an exception arising from execution of the store instruction 300 should be handled as a stack panic fault exception based on determining that the store instruction 300 comprises the custom opcode 302.

In contrast to the store instruction 300 of FIG. 3A, the embodiment shown in FIG. 3B provides a store instruction 304 that comprises a conventional opcode 306. However, the conventional opcode 306 includes a custom bit indicator 308, which may be set to indicate to the processor device 102 that the store instruction 304 is stack-panic-fault-enabled. Accordingly, in such embodiments, the processor device 102 may determine that an exception arising from execution of the store instruction 304 should be handled as a stack panic fault exception based on determining that the store instruction 304 comprises the custom bit indicator 308.

Finally, the store instruction 310 of FIG. 3C, like the store instruction 304 of FIG. 3B, comprises a conventional opcode 312. The store instruction 310, though, also comprises a custom operand 314 that indicates to the processor device 102 that the store instruction 310 is stack-panic-fault-enabled. Thus, the processor device 102 may determine that an exception arising from execution of the store instruction 310 should be handled as a stack panic fault exception based on determining that the store instruction 310 comprises the custom operand 314.

Figure 4A:
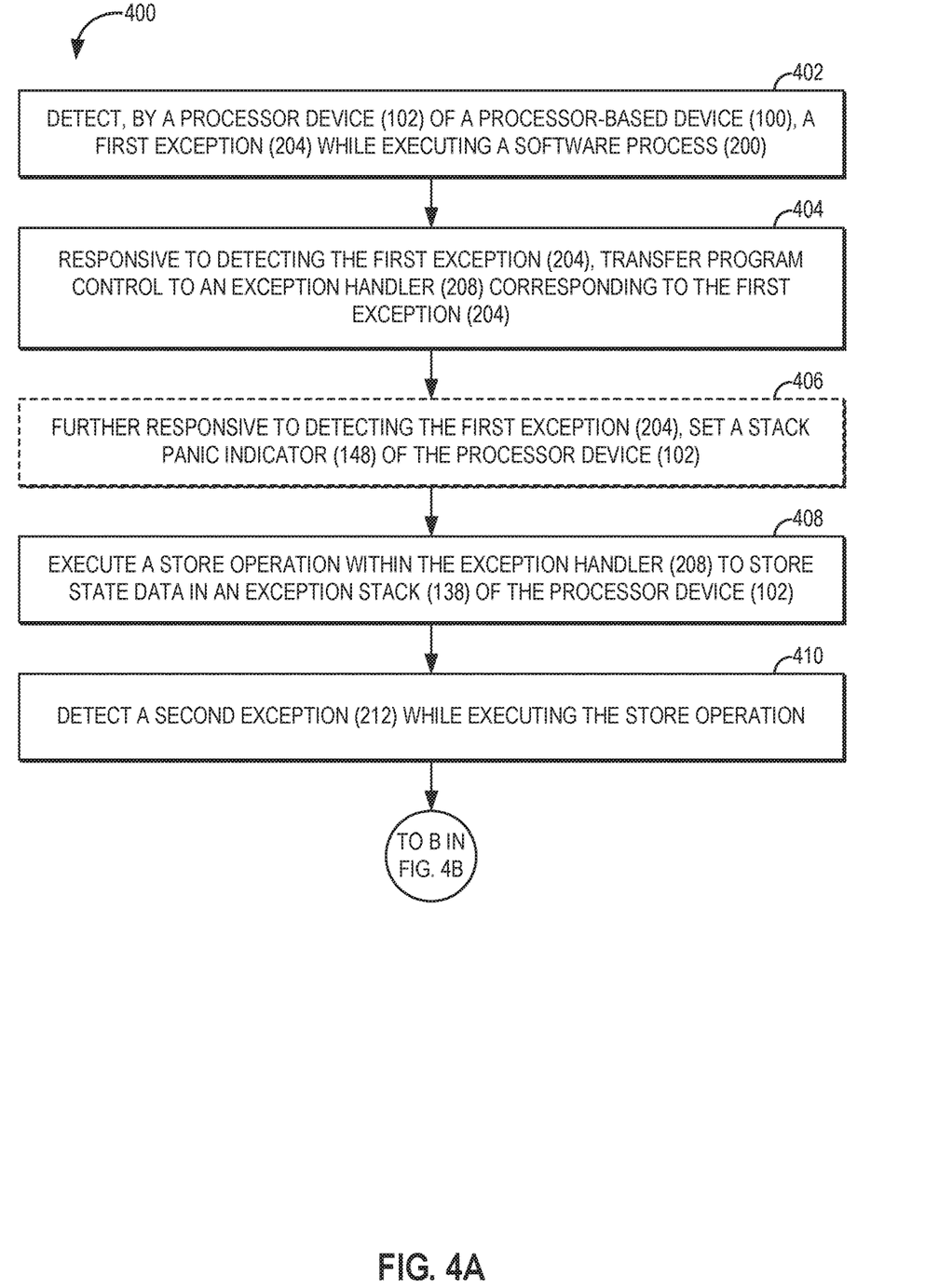
FIGS. 4A-4C provide a flowchart illustrating exemplary operations of the processor-based device of FIG. 1 for providing exception stack management using stack panic fault exceptions, according to some embodiments.
Figure 4B:
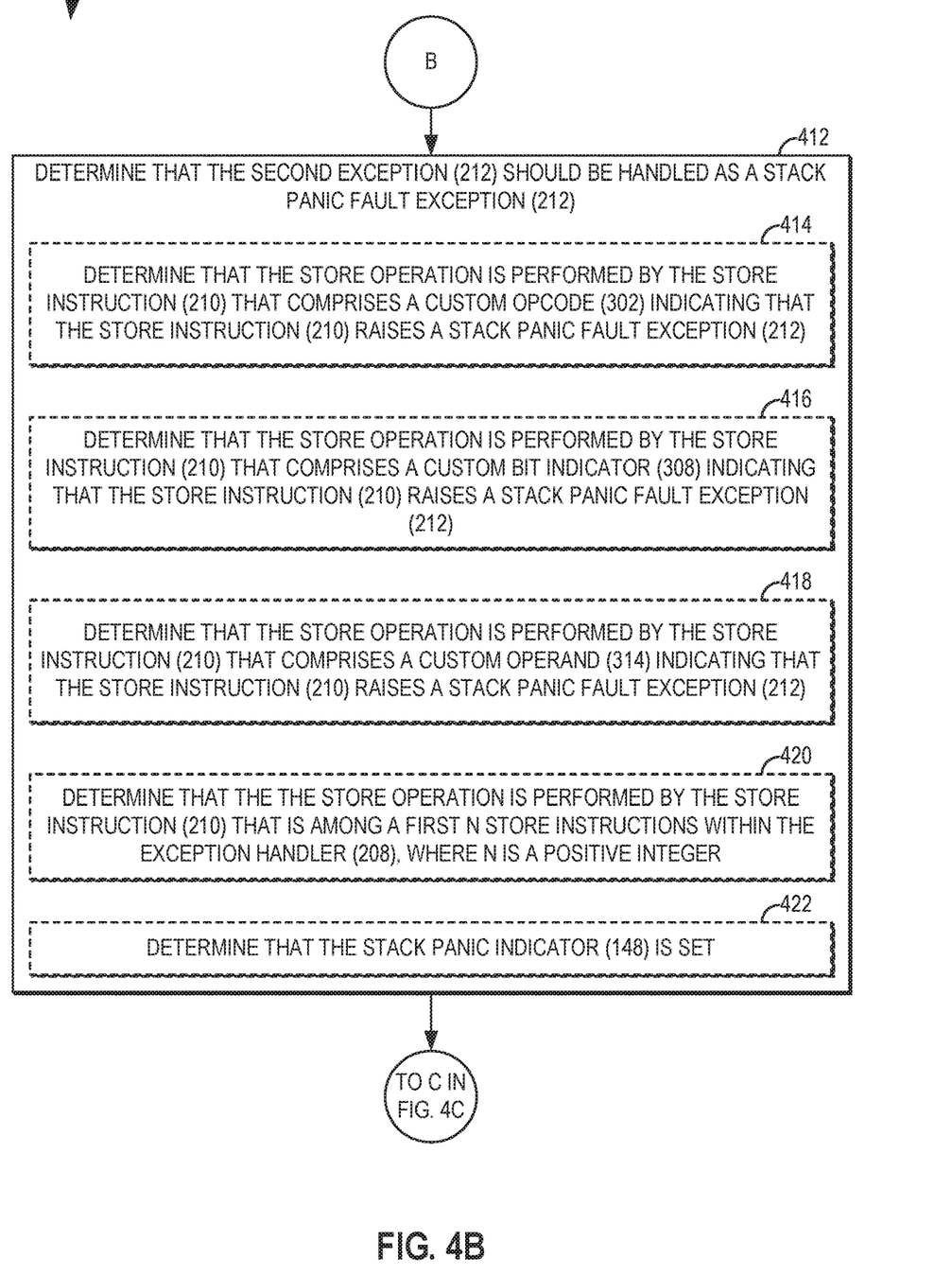
Figure 4C:
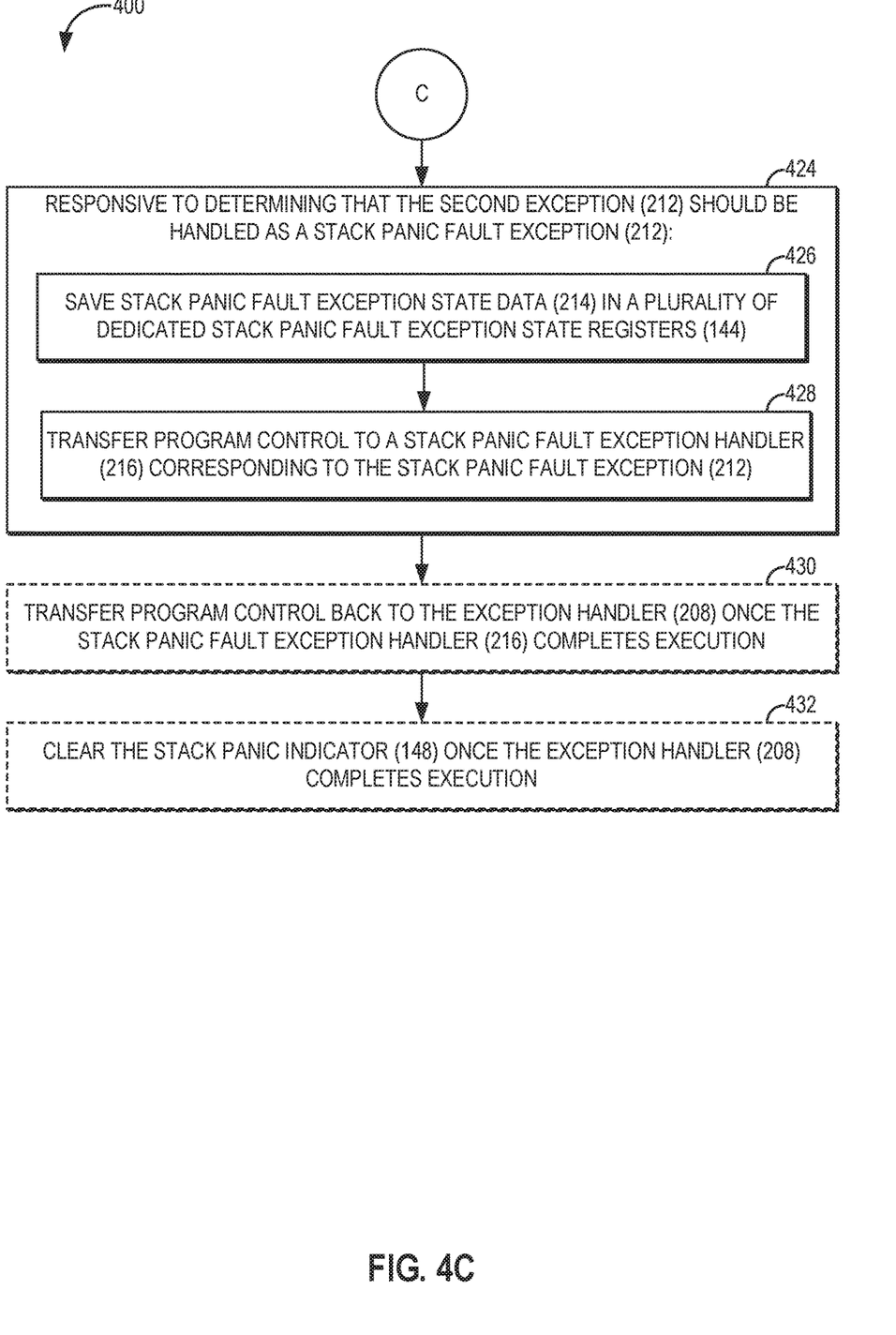

To illustrate exemplary operations for providing exception stack management using stack panic fault exceptions in processor-based devices according to some embodiments, FIGS. 4A-4C provide a flowchart 400. For the sake of clarity, elements of FIGS. 1, 2, and 3A-3C are referenced in describing FIGS. 4A-4C. Operations in FIG. 4A begin with the processor device 102 of the processor-based device 100 detecting the first exception 204 while executing the software process 200 (block 402). Responsive to detecting the first exception 204, the processor device 102 transfers program control to the exception handler 208 corresponding to the first exception 204 (block 404). In some embodiments (e.g., embodiments in which the processor device 102 is configured to employ the stack panic indicator 148 to determine that a store instruction is stack-panic-fault-enabled), the processor device 102 also sets the stack panic indicator 148 of the processor device 102 further responsive to detecting the first exception 204 (block 406). The processor device 102 next executes a store operation (e.g., by executing the store instruction 210) within the exception handler 208 to store the exception state data 206 in the exception stack 138 of the processor device 102 (block 408). The processor device 102 then detects the second exception 212 while executing the store operation (block 410). Operations then continue at block 412 of FIG. 4B.

Referring now to FIG. 4B, the processor device 102 determines that the second exception 212 should be handled as a stack panic fault exception, such as the stack panic fault exception 212 (block 412). In some embodiments, the operations of block 412 for determining that the second exception 212 should be handled as the stack panic fault exception 212 may comprise the processor device 102 determining that the store operation is performed by the store instruction 210 that comprises the custom opcode 302 indicating that the store instruction 210 raises the stack panic fault exception 212 (block 414). Some embodiments may provide that the operations of block 412 for determining that the second exception 212 should be handled as the stack panic fault exception 212 comprise determining that the store operation is performed by the store instruction 210 that comprises the custom bit indicator 308 indicating that the store instruction 210 raises the stack panic fault exception 212 (block 416). According to some embodiments, the operations of block 412 for determining that the second exception 212 should be handled as the stack panic fault exception 212 may comprise determining that the store operation is performed by the store instruction 210 that comprises the custom operand 314 indicating that the store instruction 210 raises the stack panic fault exception 212 (block 418). In some embodiments, the operations of block 412 for determining that the second exception 212 should be handled as the stack panic fault exception 212 may comprise determining that the store operation is performed by the store instruction 210 that is among a first N store instructions within the exception handler 208, where N is a positive integer (block 420). Some embodiments may provide that the operations of block 412 for determining that the second exception 212 should be handled as the stack panic fault exception 212 comprise determining that the stack panic indicator 148 is set (block 422). Operations then continue at block 424 of FIG. 4C.

Turning now to FIG. 4C, in response to determining that the second exception 212 should be handled as the stack panic fault exception 212, the processor device 102 performs a series of operations as indicated by block 424. The processor device 102 saves the stack panic fault exception state data 214 in the plurality of dedicated stack panic fault exception state registers 144 (block 426). The processor device 102 then transfers program control to the stack panic fault exception handler 216 corresponding to the stack panic fault exception 212 (block 428). In some embodiments, the processor device 102 may transfer program control back to the exception handler 208 once the stack panic fault exception handler 216 completes execution (block 430). The processor device 102 may then clear the stack panic indicator 148 once the exception handler 208 completes execution (block 432).

Figure 5:
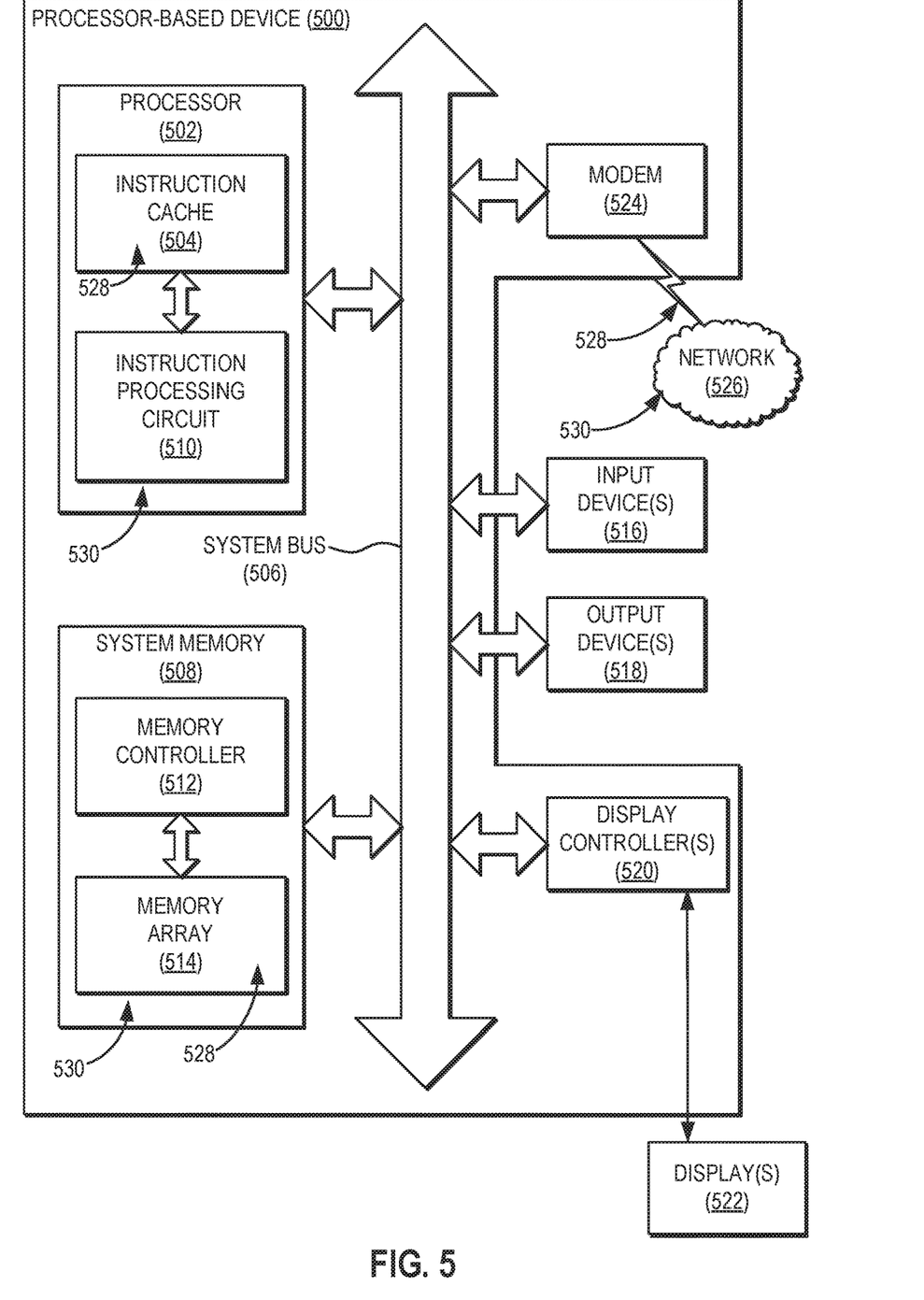
FIG. 5 is a block diagram of an exemplary processor-based device, such as the processor-based device of FIG. 1, that is configured to provide exception stack management using stack panic fault exceptions, according to some embodiments.

FIG. 5 is a block diagram of an exemplary processor-based device 500, such as the processor-based device 100 of FIG. 1, that provides exception stack management using stack panic fault exceptions. The processor-based device 500 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based device 500 includes a processor 502. The processor 502 represents one or more general-purpose processing circuits, such as a microprocessor, central processing unit, or the like, and may correspond to the processor device 102 of FIG. 1. The processor 502 is configured to execute processing logic in instructions for performing the operations and steps discussed herein. In this example, the processor 502 includes an instruction cache 504 for temporary, fast access memory storage of instructions and an instruction processing circuit 510. Fetched or prefetched instructions from a memory, such as from a system memory 508 over a system bus 506, are stored in the instruction cache 504. The instruction processing circuit 510 is configured to process instructions fetched into the instruction cache 504 and process the instructions for execution.

The processor 502 and the system memory 508 are coupled to the system bus 506 and can intercouple peripheral devices included in the processor-based device 500. As is well known, the processor 502 communicates with these other devices by exchanging address, control, and data information over the system bus 506. For example, the processor 502 can communicate bus transaction requests to a memory controller 512 in the system memory 508 as an example of a peripheral device. Although not illustrated in FIG. 5, multiple system buses 506 could be provided, wherein each system bus constitutes a different fabric. In this example, the memory controller 512 is configured to provide memory access requests to a memory array 514 in the system memory 508. The memory array 514 is comprised of an array of storage bit cells for storing data. The system memory 508 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 506. As illustrated in FIG. 5, these devices can include the system memory 508, one or more input device(s) 516, one or more output device(s) 518, a modem 524, and one or more display controller(s) 520, as examples. The input device(s) 516 can include any type of input device, including, but not limited to, input keys, switches, voice processors, etc. The output device(s) 518 can include any type of output device, including, but not limited to, audio, video, other visual indicators, etc. The modem 524 can be any device configured to allow exchange of data to and from a network 526. The network 526 can be any type of network, including, but not limited to, a wired or wireless network, a private or public network, a local area network (LAN), a wireless local area network (WLAN), a wide area network (WAN), a BLUETOOTH™ network, and the Internet. The modem 524 can be configured to support any type of communications protocol desired. The processor 502 may also be configured to access the display controller(s) 520 over the system bus 506 to control information sent to one or more display(s) 522. The display(s) 522 can include any type of display, including, but not limited to, a cathode ray tube (CRT), a liquid crystal display (LCD), a plasma display, etc.

The processor-based device 500 in FIG. 5 may include a set of instructions 528 that may be encoded with the reach-based explicit consumer naming model to be executed by the processor 502 for any application desired according to the instructions. The instructions 528 may be stored in the system memory 508, processor 502, and/or instruction cache 504 as examples of non-transitory computer-readable medium 530. The instructions 528 may also reside, completely or at least partially, within the system memory 508 and/or within the processor 502 during their execution. The instructions 528 may further be transmitted or received over the network 526 via the modem 524, such that the network 526 includes the computer-readable medium 530.

While the computer-readable medium 530 is shown in an exemplary embodiment to be a single medium, the term "computer-readable medium" should be taken to include a single medium or multiple media (e.g., a centralized or distributed database, and/or associated caches and servers) that store the one or more sets of instructions 528. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software process.

The embodiments disclosed herein may be provided as a computer program product, or software process, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor-based device, comprising:
   a processor device comprising:
      an exception stack; and
      a plurality of dedicated stack panic fault exception state registers;
   the processor device configured to:
      detect a first exception while executing a software process;
      responsive to detecting the first exception, transfer program control to an exception handler corresponding to the first exception;
      execute a store operation within the exception handler to store state data in the exception stack;
      detect a second exception while executing the store operation;
      determine that the second exception should be handled as a stack panic fault exception; and
      responsive to determining that the second exception should be handled as a stack panic fault exception:
         save stack panic fault exception state data in the plurality of dedicated stack panic fault exception state registers; and
         transfer program control to a stack panic fault exception handler corresponding to the stack panic fault exception.

2. The processor-based device of claim 1, wherein the processor device is configured to determine that the second exception should be handled as a stack panic fault exception by being configured to determine that the store operation is performed by a store instruction that comprises a custom opcode indicating that the store instruction raises a stack panic fault exception.

3. The processor-based device of claim 1, wherein the processor device is configured to determine that the second exception should be handled as a stack panic fault exception by being configured to determine that the store operation is performed by a store instruction that comprises a custom bit indicator indicating that the store instruction raises a stack panic fault exception.

4. The processor-based device of claim 1, wherein the processor device is configured to determine that the second exception should be handled as a stack panic fault exception by being configured to determine that the store operation is performed by a store instruction that comprises a custom operand indicating that the store instruction raises a stack panic fault exception.

5. The processor-based device of claim 1, wherein the processor device is configured to determine that the second exception should be handled as a stack panic fault exception by being configured to determine that the store operation is performed by a store instruction that is among a first N store instructions within the exception handler, where N is a positive integer.

6. The processor-based device of claim 1, wherein:
   the processor device further comprises a stack panic indicator;
   the processor device is configured to determine that the second exception should be handled as a stack panic fault exception by being configured to determine that the stack panic indicator is set; and
   the processor device is further configured to:
      further responsive to detecting the first exception, set the stack panic indicator;
      transfer program control back to the exception handler once the stack panic fault exception handler completes execution; and clear the stack panic indicator once the exception handler completes execution.

7. The processor-based device of claim 1, wherein the processor device is further configured to transfer program control to the stack panic fault exception handler corresponding to the stack panic fault exception based on a stack panic fault exception vector of the processor device.

8. A method for providing exception stack management using stack panic fault exceptions, comprising:
  detecting, by a processor device of a processor-based device, a first exception while executing a software process;
  responsive to detecting the first exception, transferring program control to an exception handler corresponding to the first exception;
  executing a store operation within the exception handler to store state data in an exception stack of the processor device;
  detecting a second exception while executing the store operation;
  determining that the second exception should be handled as a stack panic fault exception; and
  responsive to determining that the second exception should be handled as a stack panic fault exception:
    saving stack panic fault exception state data in a plurality of dedicated stack panic fault exception state registers; and
    transferring program control to a stack panic fault exception handler corresponding to the stack panic fault exception.

9. The method of claim 8, wherein determining that the second exception should be handled as a stack panic fault exception comprises determining that the store operation is performed by a store instruction that comprises a custom opcode indicating that the store instruction raises a stack panic fault exception.

10. The method of claim 8, wherein determining that the second exception should be handled as a stack panic fault exception comprises determining that the store operation is performed by a store instruction that comprises a custom bit indicator indicating that the store instruction raises a stack panic fault exception.

11. The method of claim 8, wherein determining that the second exception should be handled as a stack panic fault exception comprises determining that the store operation is performed by a store instruction that comprises a custom operand indicating that the store instruction raises a stack panic fault exception.

12. The method of claim 8, wherein determining that the second exception should be handled as a stack panic fault exception comprises determining that the store operation is performed by a store instruction that is among a first N store instructions within the exception handler, where N is a positive integer.

13. The method of claim 8, wherein:
  determining that the second exception should be handled as a stack panic fault exception comprises determining that the stack panic indicator is set; and
  the method further comprises:
    further responsive to detecting the first exception, setting the stack panic indicator;
    transferring program control back to the exception handler once the stack panic fault exception handler completes execution; and
    clearing the stack panic indicator once the exception handler completes execution.

14. The method of claim 8, further comprising transferring program control to a stack panic fault exception handler corresponding to the stack panic fault exception based on a stack panic fault exception vector of the processor device.

15. A non-transitory computer-readable medium having stored thereon computer-executable instructions which, when executed by a processor, cause the processor to:
  detect a first exception while executing a software process;
  responsive to detecting the first exception, transfer program control to an exception handler corresponding to the first exception;
  execute a store operation within the exception handler to store state data in an exception stack;
  detect a second exception while executing the store operation;
  determine that the second exception should be handled as a stack panic fault exception; and
  responsive to determining that the second exception should be handled as a stack panic fault exception:
    save stack panic fault exception state data in a plurality of dedicated stack panic fault exception state registers of the processor; and
    transfer program control to a stack panic fault exception handler corresponding to the stack panic fault exception.

16. The non-transitory computer-readable medium of claim 15, wherein the computer-executable instructions cause the processor to determine that the second exception should be handled as a stack panic fault exception by causing the processor to determine that the store operation is performed by a store instruction that comprises a custom opcode indicating that the store instruction raises a stack panic fault exception.

17. The non-transitory computer-readable medium of claim 15, wherein the computer-executable instructions cause the processor to determine that the second exception should be handled as a stack panic fault exception by causing the processor to determine that the store operation is performed by a store instruction that comprises a custom bit indicator indicating that the store instruction raises a stack panic fault exception.

18. The non-transitory computer-readable medium of claim 15, wherein the computer-executable instructions cause the processor to determine that the second exception should be handled as a stack panic fault exception by causing the processor to determine that the store operation is performed by a store instruction that comprises a custom operand indicating that the store instruction raises a stack panic fault exception.

19. The non-transitory computer-readable medium of claim 15, wherein the computer-executable instructions cause the processor to determine that the second exception should be handled as a stack panic fault exception by causing the processor to determine that the store operation is performed by a store instruction that is among a first N store instructions within the exception handler, where N is a positive integer.

20. The non-transitory computer-readable medium of claim 15, wherein:
  the computer-executable instructions cause the processor to determine that the second exception should be handled as a stack panic fault exception by causing the processor to determine that the stack panic indicator is set; and
  the computer-executable instructions further cause the processor to:

further responsive to detecting the first exception, set the stack panic indicator;
transfer program control back to the exception handler once the stack panic fault exception handler completes execution; and
clear the stack panic indicator once the exception handler completes execution.

\* \* \* \* \*